United States Patent [19]
Louks et al.

[11] 3,855,761
[45] Dec. 24, 1974

[54] APPARATUS AND METHOD FOR REMOVING TASSELS

[76] Inventors: Robert A. Louks; Gordon D. Louks, both of Gilman, Iowa

[22] Filed: Apr. 12, 1973

[21] Appl. No.: 350,586

Related U.S. Application Data

[63] Continuation of Ser. No. 225,085, Feb. 10, 1972, abandoned.

[52] U.S. Cl. ..................... 56/51, 171/58, 56/DIG. 2
[51] Int. Cl. ........................................... A01d 45/02
[58] Field of Search ........... 56/51, 52, 53, 504, 505, 56/1, DIG. 2; 171/28, 58

[56] References Cited
UNITED STATES PATENTS

| | | | |
|---|---|---|---|
| 2,239,458 | 4/1941 | Hetzel | 171/28 |
| 2,397,249 | 3/1946 | Dostal | 171/58 |
| 2,953,209 | 9/1960 | De Marco | 171/28 |
| 2,958,174 | 11/1960 | Lawson | 171/58 |
| 3,710,564 | 1/1973 | Sammann | 171/58 X |
| 3,724,184 | 4/1973 | Wright | 56/51 |
| 3,736,730 | 6/1973 | Dobson | 171/58 X |
| 3,769,782 | 11/1973 | Cler | 171/58 X |

*Primary Examiner*—Russell R. Kinsey

[57] ABSTRACT

A device for removing tassels from plant stalks including a pair of rollers mounted on a framework in parallel contacting relationship. A stalk contacting means such as a bar is disposed forward of the rollers and adapted to bend the stalks forward as the device moves over the stalks. The stalks snap back as the rollers pass thereover such that the tassels at the upper parts thereof are gripped between the rollers and removed. Guard means are disposed beneath the rollers to prevent leaves on the stalks from being gripped by the rollers.

A method of removing tassels including the steps of bending stalks ahead a detasseler, allowing the stalks to snap back as the detasseler passes thereover, and removing the tassels while keeping the stalk leaves out of contact with the detasseler rollers is also disclosed.

5 Claims, 10 Drawing Figures

PATENTED DEC 24 1974

APPARATUS AND METHOD FOR REMOVING TASSELS

This is a continuation of application Ser. No. 225,085, filed Feb. 10, 1972 and now abandoned.

BACKGROUND OF THE INVENTION

It is a common practice in the hybrid seed corn industry to remove the tassels from the tops of certain rows of corn plants or stalks in a seed corn field. The removal of the tassels is preferably done in a manner that causes a minimum of damage to the plant.

The most prevalent method of detasseling corn is, and has been for many years, hand removal. This method is very effective and when properly done results in minimum plant damage. However, the economic factors and personnel problems involved in a hand detasseling operation make such method unattractive for large scale operations.

Several attempts have been made in the past to mechanize the detasseling operation. For example, see U.S. Pat. Nos. 2,397,249; 2,163,849 and 3,524,308. Recently, a device using rotating blades such as in a rotary lawnmower has been used for this purpose. The devices described above have proved satisfactory in some instances, but nevertheless a need has long existed for a detasseling device which is effective, economical, and which causes minimum damage to plants. None of the prior art devices are very satisfactory when operating in a field having widely varied stalk heights.

A need has also existed for an improved method of detasseling plants such as corn stalks.

SUMMARY OF THE INVENTION

The present invention relates to an improved method and device for removing tassels from plant stalks, and more specifically to a method and device wherein the stalks are bent over forward of the detasseler and then allowed to snap back for tassel removal without damage to the plant itself.

In accordance with the apparatus of this invention, a detasseling device including a pair of parallel contacting rollers having a resilient outer surface are mounted on a framework adapted to be carried by a conventional high clearance vehicle. One or more devices may be carried by one vehicle. A stalk contacting means adapted to contact the stalks forward of the tassel pulling rollers is provided, and is positioned such that the stalks can snap back up as the device passes thereover. The device may be adjustably mounted on the vehicle as to height according to the height of the plants to be detasseled, and generally will be powered by a hydraulic or other suitable source on the vehicle.

Accordingly, it is an object of the invention to provide an improved device for removing tassels from plant stalks.

It is a further object to provide such a device that is effective and that produces a minimum of damage to the plants.

It is still a further object to provide an improved method of removing tassels from plant stalks.

DESCRIPTION OF THE PREFERRED EMBODIMENTS

Figure 1:
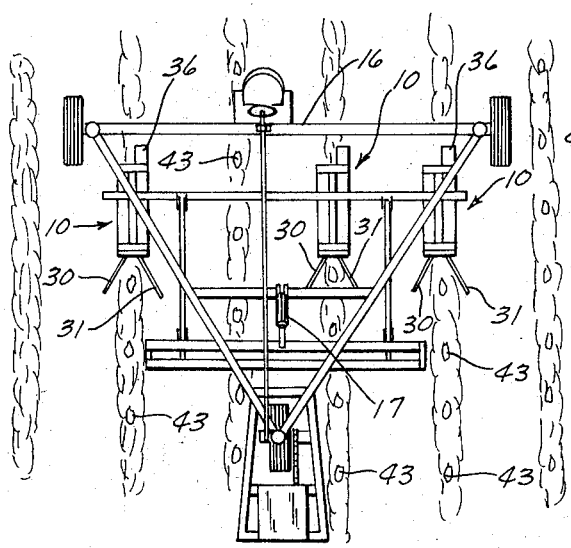
FIG. 1 is a plan view of a vehicle carrying a plurality of detasseling devices through a field.

The preferred embodiments of the invention will be described in detail with reference to the drawings, wherein the details of the preferred device are best illustrated in FIGS. 3-7, and various aspects of the operation thereof are depicted in FIGS. 1, 2, 8, 9 and 10.

First referring to the device itself, illustrated generally at 10, a framework is comprised of a forward member 11 (FIG. 3), a rear member 12, and a longitudinal connecting member 13. A mounting bracket 14, not constituting a part of the invention, is shown connecting the device 11 to a mounting bar 15. It is to be understood that the details of the mounting arrangement, the vehicle 16 (FIGS. 1 and 2), and the means 17 (FIG. 2) for adjusting the height of the device 11 may be any one of many types readily available in the art.

A pair of elongated rotatable cylindrical members or rollers 18 and 19 are disposed within the framework and supported by bearings 20 at each end, the bearing supports 21 in turn being affixed to the framework.

Figure 3:
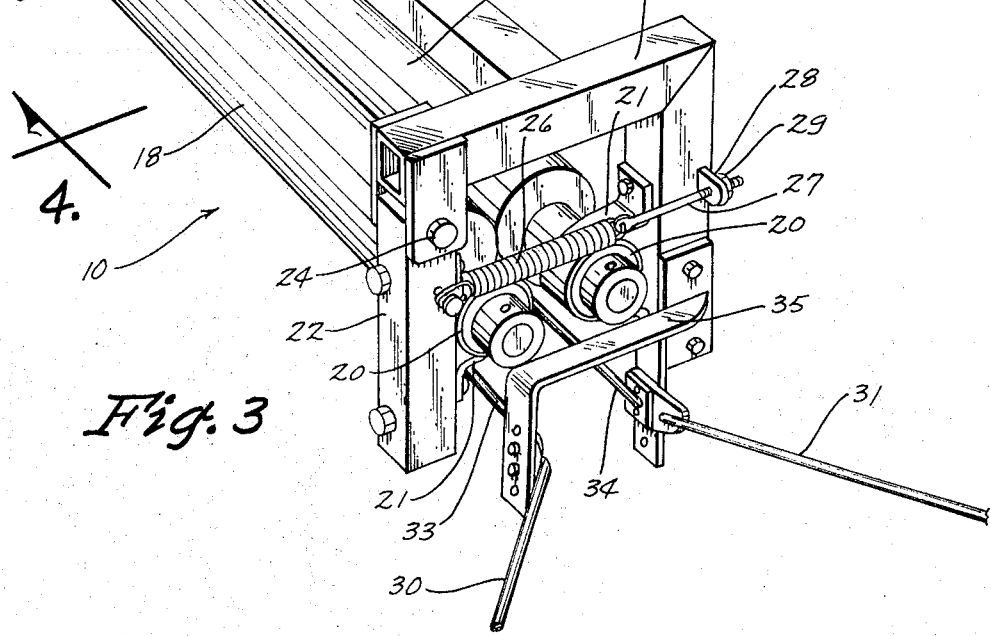
FIG. 3 is an enlarged perspective view showing a detasseling device according to the invention.

At the forward and rear ends of the framework, depending arms 22 and 23 are pivotally mounted to the framework at 24 and 25, respectively. Roller 18 is thus adjustably positionable with respect to roller 19 by movement of arms 22 and 23. As best seen in FIG. 3, a tension spring 26 is fixed at one end to arm 22 and at the other end to a threaded bolt 27 passing through ear 28 rigidly affixed to forward member 11 of the framework. Nut 29 may be adjusted to achieve the desired contact pressure between the front of rollers 18 and 19 at their point of contact. Identical means are provided for adjusting the contact pressure at the rear of rollers 18 and 19. Preferably, the pressure between rollers 18 and 19 is uniform along the line of contact.

Guide fingers 30 and 31 (FIGS. 3 and 5) extend outwardly at an angle from the forward end of the device, and serve to guide plant stalks toward the center of the device.

A deflector shield 32 (FIGS. 4, 7 and 10) is provided above the rollers 18 and 19 to direct the removed tassels (FIG. 10) away from the device, where they are either caught in a suitable container (not shown) or picked up by hand.

Guard means consisting of elongated rods 33 and 34 are affixed to the framework (see FIG. 7) below and aligned with rollers 18 and 19. The rods 33 and 34 serve to prevent plant leaves from being caught between the rollers as will be explained in detail below. The guard rods also serve to prevent the plant stalk below the tassels from being caught between the rollers.

Figure 7:
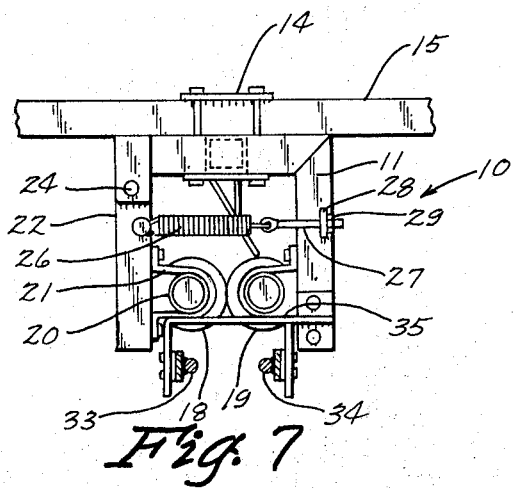
FIG. 7 is a front end view of the device.

An important feature of the device of this invention is a means for contacting the upper portion of the plant stalks forwardly of the rollers to bend them over. This means, referred to hereinafter as a bumper 35, is illustrated in FIG. 3 as the horizontal section of an "L" shaped member 36 affixed to the device. The bumper can be of any suitable material, and can be attached by any one of several methods, such as by welding, riveting, or by being bolted on to the device. Preferably, the bumper 35 is positioned at or just above the bottom surfaces of the rollers 18 and 19 as best seen in FIG. 7.

Figure 5:
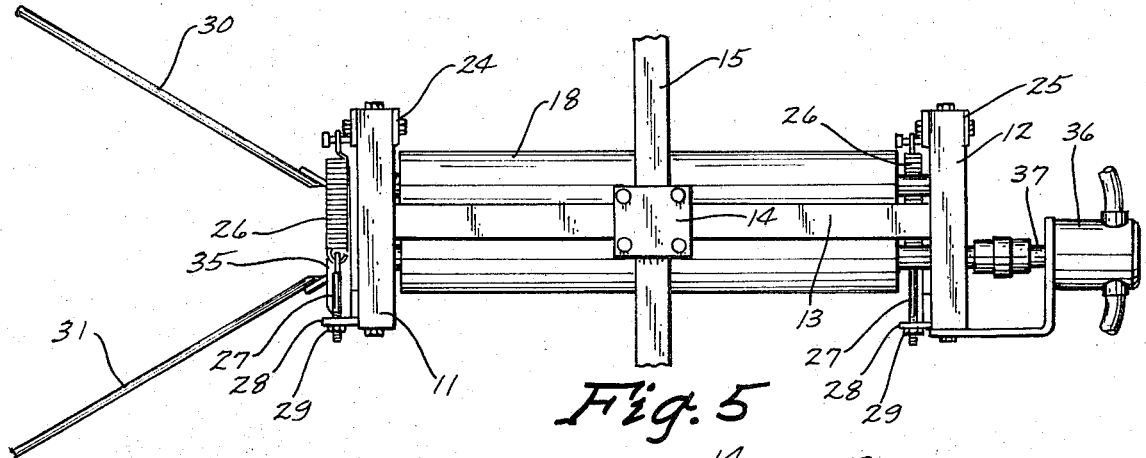
FIG. 5 is a top plan view of the device.
Figure 6:
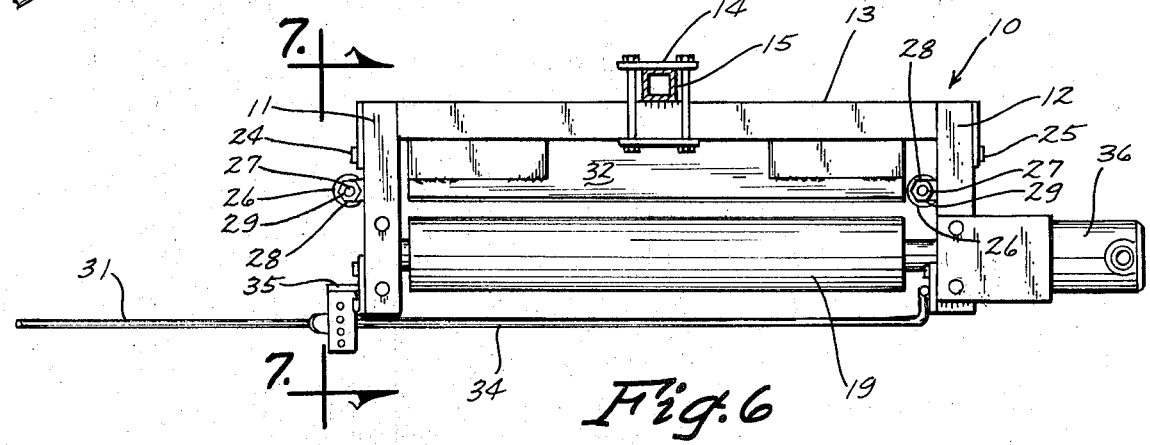
FIG. 6 is a side elevational view of the device.

A preferred means for rotating the rollers 18 and 19 is shown in FIGS. 5 and 6 as a hydraulic motor 36 connected by shaft 37 to roller 19. The other roller 18 is an idler roller, and is rotated by frictional contact with driven roller 19 as is well understood. The hydraulic motor 36 is preferably operated by a hydraulic system on the carrying vehicle. Obviously, many other means could be utilized to rotate the rollers 18 and 19.

Figure 2:
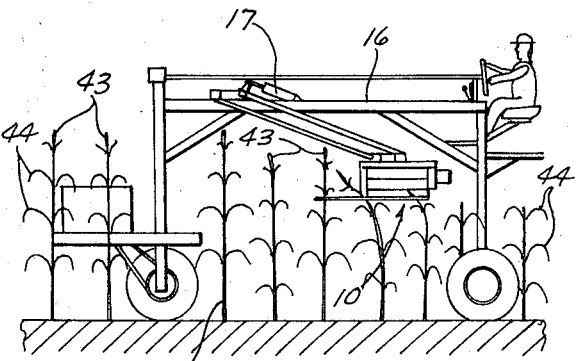
FIG. 2 is a side elevation showing a vehicle carrying a detasseling device in a field.

FIGS. 1 and 2 illustrate generally the manner of using detasseling devices. This invention is not, however, predicated on the manner of attaching the device to a vehicle or on the height adjusting means, all of which are known in the art. FIG. 1 illustrates a vehicle 16 having three tassel pulling devices 10 mounted thereon. This arrangement is suited to operation in a field having two rows of plants to be detasseled alternately planted with one row of plants not to be detasseled. Again, this aspect of the operation is not considered part of the invention.

Figure 4:
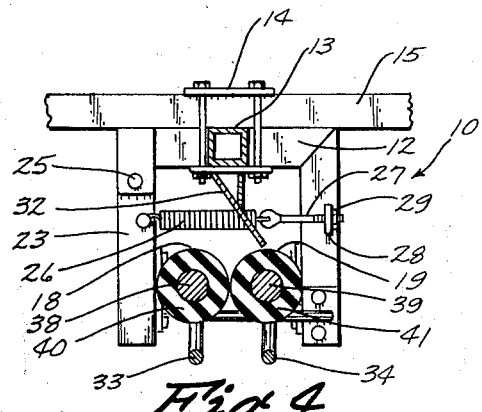
FIG. 4 is a cross sectional view of the detasseling device.

The rollers 18 and 19, shown in cross section in FIG. 4, include central shafts 38 and 39, and have outer coverings 40 and 41 of a resilient material such as rubber. The outer coverings 40 and 41 are preferably at least ½ inch thick, and may be thicker. The rollers themselves are preferably 4 to 6 inches in diameter, and from 1 ½ to 3 feet in length. The length of the rollers is related to the speed of the vehicle carrying the device, as will be explained more fully below. The rollers 18 and 19 preferably rotate at a speed of about 1000 revolutions per minute, resulting in a surface speed of about 1,560 feet per minute for a 6 inch diameter roller. Rollers with a diameter of about 4 inches would be rotated faster, such as at 1,500 RPM, to get a comparable surface speed. Smaller rollers are desirable in that they pull fewer leaves from the stalk; but the rollers cannot be so small as to result in missing tassels from plants slightly out of line with the others in the row. Also, irregular movement of the carrying vehicle would cause smaller rollers to be less effective. Generally, rollers having a diameter of less than 3 inches are not satisfactory for normal operating conditions.

Figure 9:
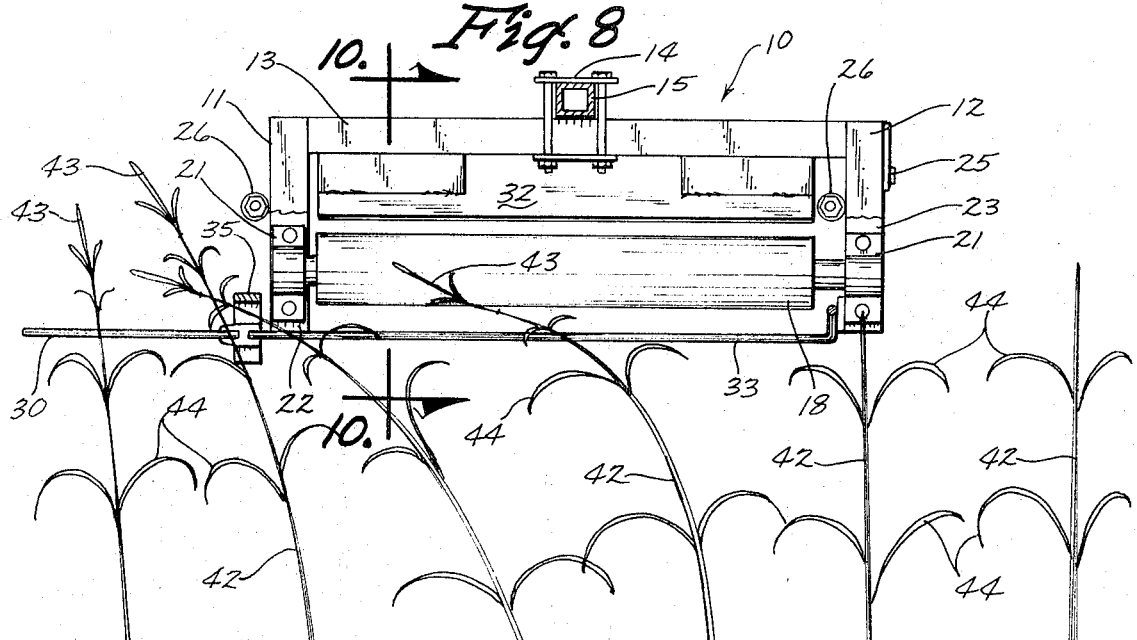
FIG. 9 is a side view of the device passing over a row of plant stalks.
Figure 10:
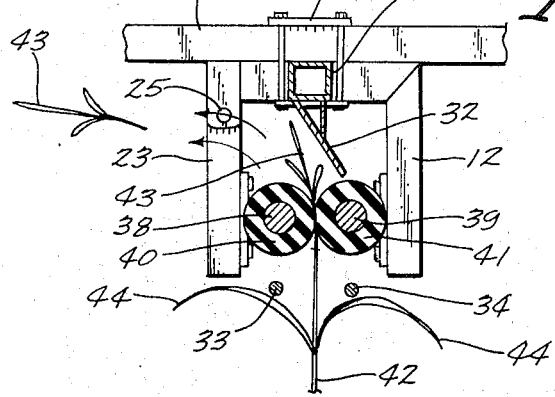
FIG. 10 is a cross sectional view of the device in operation.

The operation of the device 10 will now be described by reference to FIGS. 8 – 10. It is understood that the device 10 illustrated therein is suitably mounted on a vehicle as shown in FIGS. 1 and 2. The following description of the operation of the device 10 will also encompass the novel method of this invention, which may be conveniently carried out by the device 10, although other equipment could be utilized, and certain steps in the method could be carried out by hand, although not very efficiently.

Figure 8:
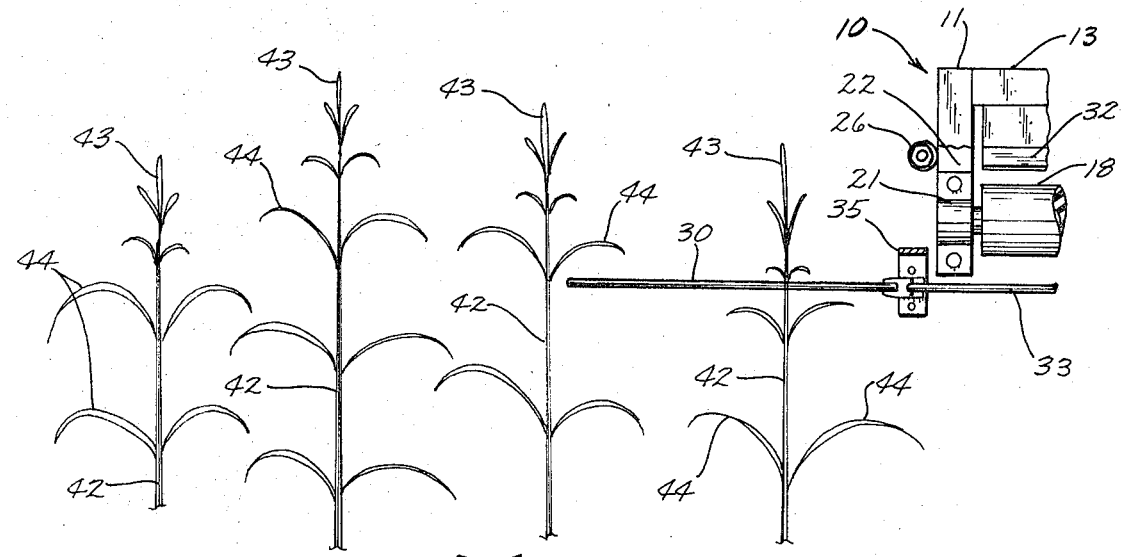
FIG. 8 is an enlarged side view of a portion of the device approaching a row of plant stalks.

A series of plant stalks 42 having tassels 43 is shown in FIG. 8. A detasseling device 10, suitably mounted to a carrier vehicle (not shown) is approaching the plant stalks 42 from right to left. It will be noted that the plant stalks are not of uniform height, and this invention provides for detasseling plant stalks of varying height, as will be explained. Guide finger 30 on the far side of the plant stalks, and cooperating guide finger 31 (not shown in FIGS. 8 and 9) engage the upper portion of the plant stalks and direct them toward the center of detasseling device 10. As best seen in FIG. 9, bar 35 contacts the stalk ahead of the rollers 18 and 19 and bends it forward. As the detasseling device continues to move from right to left, the plant stalk 42 will snap upward (after the bar 35 has passed thereover) such that the tassel 43 will be urged between the rollers 18 and 19. Continued rotation of the rollers as the unit moves forward will cause the tassel to be separated from the plant stalk and ultimately ejected away from the unit as shown in FIG. 10. The stalk 42 is prevented from being engaged by the rollers by the action of guard rods 33 and 34. These rods contact the upper leaves 44 as the stalk 42 snaps upwardly, and holds the leaves 44 and stalk 42 out of engagement with the rollers while the unit is traversing the stalk. FIG. 9 shows stalks 42 which have had the tassels removed. Note that even though some of the detasseled stalks extend to a height above the contact line of the rollers, as shown at 45 in FIG. 9, the action of the guard rods 33 and 34 prevents the stalk itself from being contacted by the rollers, which would result in damage or uprooting of the stalk.

The optimum length of rollers 18 and 19 is related to the speed at which the vehicle carrying same is to travel. For rollers of about 18 inches length a good rate of speed is about 2 miles per hour. For rollers 30 inches in length, a speed of about 3 ½ miles per hour is optimum. In general, a vehicle speed of from about 1.2 to 1.7 miles per hour per foot of length of contact between rollers is preferred.

It will be apparent that many variations of details of operation may be utilized without departing from the method of the invention. For example, roller diameter and rate of rotation may be varried between considerable ranges. In this regard, a surface speed for the rollers of from 1,200 to 1,800 feet per minute is preferred. The critical feature of the method of the invention involves bending the stalks over ahead of the rollers and allowing them to snap back up, with the non-tassel portions of the plants being kept out of contact of the rollers.

It will be apparent that the taller stalks will be partially, and in extreme cases almost entirely, passed by the rollers before they are contacted thereby, resulting in only a short time for the rollers to pull the tassels. This in turn results in only the tassel being removed instead of the entire part of the stalk normally above the contact line of the rollers.

While no mechanical device is so completely effective as to obviate the need for a manual "clean-up" subsequent to the mechanical detasseling, the apparatus and method of this invention reduces the manual pulling to a minimum.

The foregoing description of preferred embodiments of the apparatus and method of this invention should be regarded as illustrative, and not as limiting of the invention.

We claim:

1. A device for removing tassels from cornstalks comprising:

a framework;

a pair of horizontal rotatable cylindrical members having axes extending substantially parallel to the direction of travel of the device, said cylindrical members being in parallel contacting relationship and supported by the upper portion of said framework to dwell substantially above ground level adjacent the upper portion of said stalks, the outer surfaces of said members being of slightly resilient material;

means on said framework for rotating said cylindrical members;

stalk contacting means disposed forwardly of said rotatable cylindrical members, the stalk contacting means being adapted to bend stalks forwardly of the rotatable cylindrical members so that said stalks are in a forwardly bent position as said device moves forwardly thereover;

guide fingers carried by said framework and extending forwardly and outwardly from said cylindrical members to guide the upper portions of said stalks to engagement with said stalk contacting means;

and guard means carried by said framework and disposed below said rotatable cylindrical members, said guard means comprising spaced apart elongated members adapted to inhibit contact between plant leaves and the rotatable cylindrical members as the tassels are pulled from said stalks by said cylindrical members as they are rotated upon the forward movement of said device, said elongated members being spaced horizontally apart a distance sufficient to permit said tassels to pass freely therethrough but close enough together to restrain the engagement of leaves with said cylindrical members.

2. The device of claim 1 wherein said means on said framework for rotating said cylindrical members provides rotational power directly to only one of said cylindrical members, the other of said cylindrical members being an idler roller rotated by frictional contact with the cylindrical member to which rotational power is supplied.

3. The device of claim 1 including means at each end of said framework for adjusting the contacting pressure between the rotatable cylindrical members.

4. The device of claim 1 wherein:
said framework is adapted for mounting on a high-clearance vehicle;
the outer surfaces of said rotatable cylindrical members are composed of a rubber compound of approximately one half inch thickness;
the rotatable cylindrical rollers are urged together by adjustable tension means at the forward and rearward ends of said framework, said adjustable tension means being connected to means pivotally attached to said framework; and
a deflector means is provided on said framework for deflecting pulled tassels away from the device.

5. A method of operating a device for removing tassels from cornstalks, the device having a pair of rotatable cylindrical members in parallel contacting relationship, comprising the steps of:
aligning the rotatable cylindrical members with a row of stalks having tassels to be removed and moving the cylindrical members forwardly and longitudinally with respect to said row so that the line of contact between the rotatable cylindrical members is below the tops of most of the tassels but not below the bottoms of most of the tassels;
maintaining the cylindrical members substantially level with the ground;
bending the tasseled stalks forwardly in advance of the cylindrical members so that the bent tassels and leaves on the upper portion of the bent stalks pass beneath the forward end of the cylindrical members; and
removing the tassels from said bent stalks with said rotatable cylinders while simultaneously restraining the leaves on said bent stalks from engagement with said cylinders as said device moves in a forwardly direction.

* * * * *